United States Patent [19]

Christensen

[11] Patent Number: 4,631,732

[45] Date of Patent: Dec. 23, 1986

[54] HIGH FREQUENCY RF DISCHARGE LASER

[76] Inventor: Clad P. Christensen, 2233, Arlington Ter., Alexandria, Va. 22303

[21] Appl. No.: 603,846

[22] Filed: Apr. 25, 1984

[51] Int. Cl.$^4$ ............................................. H01S 3/097
[52] U.S. Cl. ........................................ 372/87; 372/82; 372/86; 372/64
[58] Field of Search ...................... 372/82, 83, 86, 87; 333/248, 246

[56] References Cited

U.S. PATENT DOCUMENTS 3,815,047  6/1974  Smith et al. ............................ 372/64

OTHER PUBLICATIONS

Lachambre et al; "A Transversely RF-Excited $CO_2$ Waveguide Laser", *Appl. Phys. Lett.* 32 (10), 15 May 1978.
Christensen; "Pulsed Transverse Electrodeless Discharge Excitation of a $CO_2$ Laser", *Appl. Phys. Lett.* 34 (3), 1 Feb. '79.
Christensen et al; "200 MHz Electrodeless Discharge Excitation of an XeF Laser", *Appl. Phys. Lett.* 41 (9), Nov. '82.
Cohn; "$CO_2$ Laser Excited by Preionized Transverse Discharge Through a Dielectric", *Appl. Phys. Lett.* 37 (9), 1 Nov. '80.

*Primary Examiner*—Leon Scott, Jr.
*Attorney, Agent, or Firm*—Wegner & Bretschneider

[57] ABSTRACT

A high frequency, high energy RF powered laser is shown and described. This laser utilizes a stripline wave guide electrode, a ground plane, and dielectric materials for the lasing tube to provide for resistance to spurious discharge and parasitic breakdown between the stripline and the ground plane. The use of a high voltage pulse to initiate lasing gas breakdown, the use of a dielectric section in the stripline wave guide to protect the RF source and a choke to protect the high voltage pulse source from RF energy are also shown and described.

26 Claims, 3 Drawing Figures

HIGH FREQUENCY RF DISCHARGE LASER

STATEMENT OF RIGHTS

This invention was made with Government support under contract N00014-83-C-2214 awarded by the Naval Research Laboratory. The Government has certain rights in this invention.

BACKGROUND OF THE INVENTION

1. Field of the Invention

This invention relates to the construction and operation of lasers capable of operating at a very high excitation power levels and very high excitation frequencies, in the order of 200 megahertz to 10 gigahertz. The invention provides for operation at gas pressures in excess of one atmosphere, and for excitation levels exceeding 10 kilowatts per cubic centimeter.

2. Description of the Prior Art

In much of the prior art lasers, low pressure carbon dioxide has been utilized as the lasing gas, and low excitation frequencies in the order of ten to two hundred megahertz have been used. However, there have a limited number of reports of use of higher excitation frequencies and other lasing gases:

An X-Band RF pumped laser which operates in the frequency range of 8 to 12 gigahertz has been developed by Waynant, Epp, and Christensen U.S. Pat. No. 4,513,414. In this device, RF (radio frequency) coupling to the lasing medium is provided by a coupling plate forming a common wall between a wave guide and a RF cavity. A standing wave pattern is produced within the RF cavity which excites a lasing medium. Since these devices use a hollow wave guide coupling structure, they become extremely large and cumbersome at lower frequencies. In this design preionization is accomplished by use of an auxiliary discharge tube.

RF excitation of an XeF laser with a 200 megahertz source has been reported in an article entitled "200 MhZ Eelectrodeless Discharge Excitation of an XeF Laser", by Christensen and Waynant, Applied Physics Letter 41(9), p. 794, Nov. 1, 1982. In this device the physical size of the laser was small enough to allow lumped circuit techniques to be used in its design. However, no preionization was used, and the design was suitable for use with RF frequencies of no more than a few hundred megahertz.

Lasers excited by RF discharges produced in tapered sections of hollow wave guides are also known and have been described in the U.S. Pat. No. 4,004,249, Kikuchi; and in an article entitled, "LASER Generations by Pulsed 2,45-GH$_z$ Microwave Excitation of CO$_2$", by Handy and Brandelik, Jour. Appl. Phys. 49(7), p. 3753 (1978). These devices utilize hollow wave guide structures and hence become extremely cumbersome at frequencies below 2 gigahertz. In these devices there has also been no disclosure of any preionization, and there is no disclosed use of high pressure gases. This apparatus essentially consists of placement of a pyrex lasing tube parallel to the H plane of a rectangular S-band wave guide.

Capacatively ballasted lasers using lower RF frequencies are known. These lasers operate at frequencies in the 30 megahertz range and utilize lumped circuit techniques for construction of the discharge head and for impedance matching. These devices however are not useful at high RF frequencies where transmission line techniques must be employed.

An unballasted RF discharge laser has been described in a patent awarded to Laakmann, U.S. Pat. No. 4,169,251. This unballasted configuration has been used in commercial carbon dioxide lasers marketed by Laakmann Electro-optics and by Hughes in the United States. These devices however operate at gas pressures below one atmosphere and at relatively low excitation levels. At higher gas pressures and high RF power levels, unballasted RF discharges develope inhomogeneities and instabilities that severly limit their utility. Still further, the use of metallic electrodes in contact with the laser gas is undesirable when corrosive gas mixtures are considered.

BRIEF SUMMARY

This invention incorporates the use of capacitive ballasting of the discharge to improve stability and homogeneity, the use of transmission line techniques and a stripline geometry to achieve efficient delivery of RF excitation power at very high RF frequencies, the use of insulating dielectric materials in transmission line structure which will withstand high power RF levels, preionization of the lasing gas, and use of a metal free tube for containment of a discharge plasma.

This invention provides for placement of a conducting strip above a ground plane to form a stripline waveguide, placement of a discharge tube constructed of dielectric material between the ground plane and the conducting strip, the use of a high voltage pulse to initiate lasing gas breakdown, the use of means to protect the RF generator from the high voltage pulse, and the use of an RF choke to prevent the high voltage pulse source from damage that may be induced by the radio frequency energy in the stripline wave guide.

DESCRIPTION OF THE PREFERRED EMBODIMENT

Figure 1:
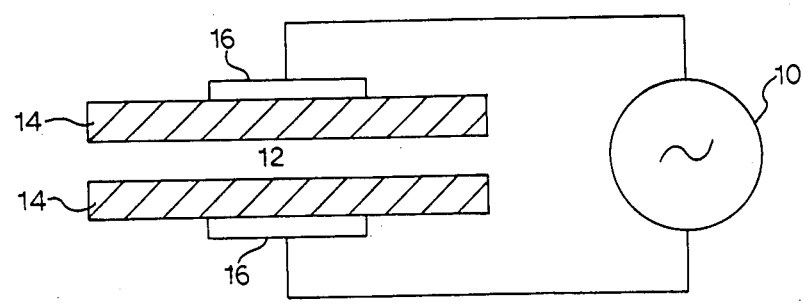
In FIG. 1 there is shown a simplified sketch of the elements of an RF laser incorporating capacative ballasting.

In FIG. 1 there is illustrated a simple representation of capacitive ballasting which is provided when a dielectric material is placed between the discharge electrodes and the discharge plasma. The RF (radio frequency) source 10 applies RF voltage across the discharge region 12. A significant fraction of the applied high voltage is dropped across the dielectric materials 14. Capacative ballasting prevents nonuniform parasitic breakdown and thus provides improved stability and homogeneity of the lasing action. Electrodes 16 apply RF energy to the system.

Figure 2:
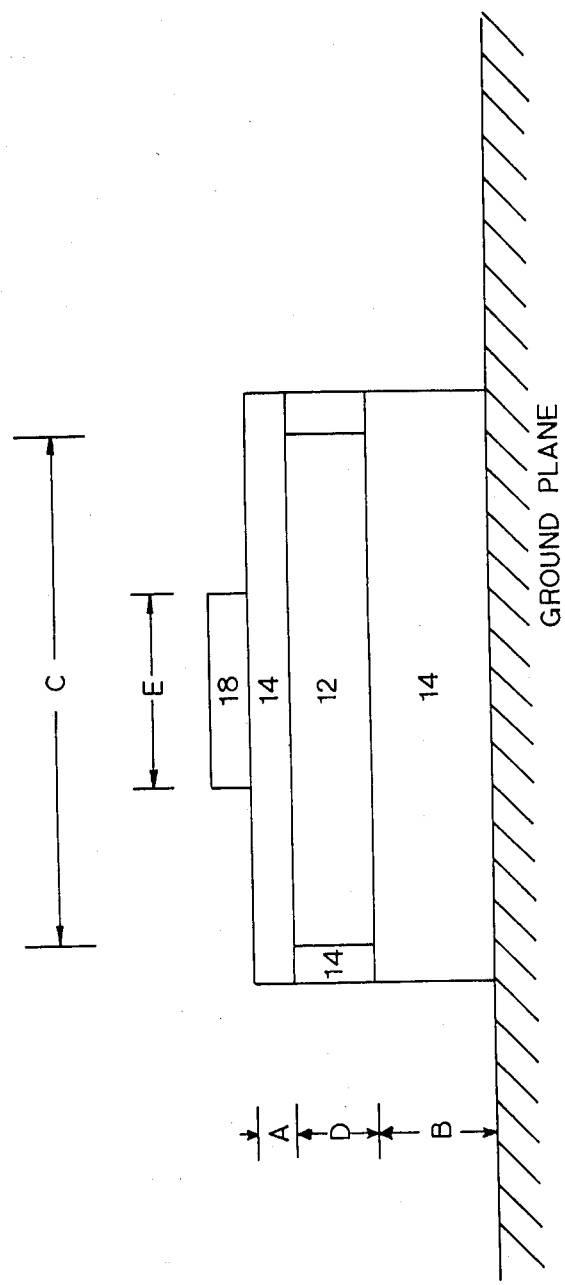
FIG. 2 there is shown the relationship between various cross sections of the materials used to construct the laser of this invention.

The relationship between the physical size of various materials of this invention is shown in FIG. 2. During operation, a high power, high frequency RF pulse is guided to the discharge region 12 by a microstrip transmission line 18. The use of high RF frequencies (in the order of 200 megahertz to 10 gigahertz) allows large RF currents to flow through the plasma in the discharge region 12 without breakdown of the dielectric walls 14.

The rate at which RF power is deposited into the plasma as the RF wave propagates down the discharge structure can be varied by adjusting the thicknesses of the dielectric materials denoted as A and B of FIG. 2. The relative width and height of the plasma region 12 is controlled by dimensions C and D as well as the width of the discharge electrode 18 (stripline) denoted by dimension E. The capacative ballasting is provided through choice of the dielectric material and dielectric thickness (dimensions A and B) of FIG. 2. The capacative impedance of the dielectric materials 14 should be greater than the resistive impedance of the plasma in the region 12.

Since RF fields of tens of kilovolts per centimeter are often present on the discharge tube electrodes of this invention, it is desirable to immerse the microstrip transmission line or electrode 18, the termination of the transmission line 34, and the discharge tube 42 in a dielectric material such as a fluid to prevent spurious electrical breakdown. Appropriate fluids may be mineral oil or liquid fluorocarbons. The dielectric may also be a solid material which is formed from the material in which the elements 18, 42, and 34 are immersed. Plastic or ceramic materials may also be used as the discharge tube materials 14.

Figure 3:
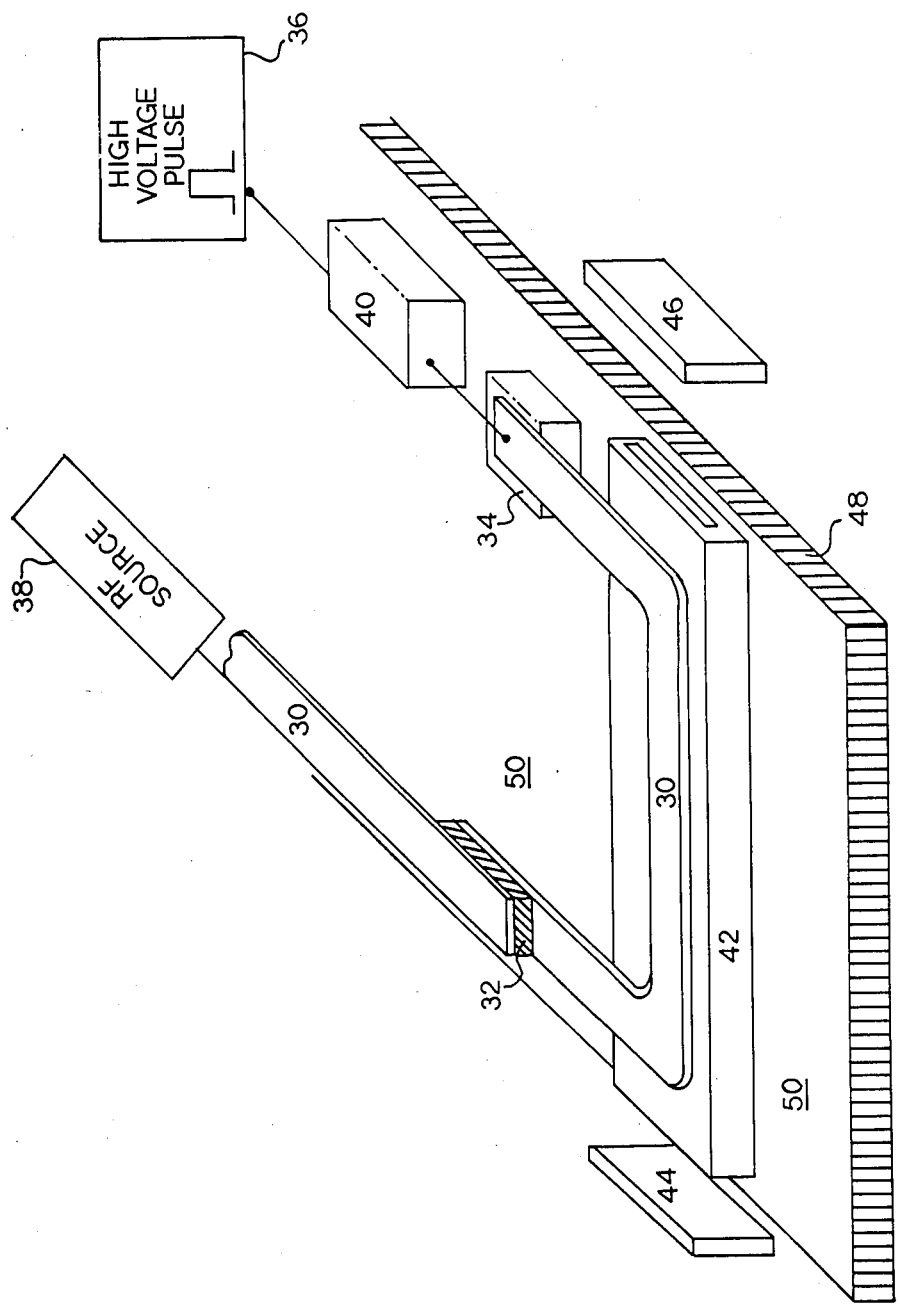
In FIG. 3 there is shown a complete embodiment of the laser in accordance with this invention including an RF stripline waveguide configuration.

In FIG. 3 there is shown a stripline wave guide 30 which includes a dielectric insulator 32 and an RF termination 34. The electrical impedance of the RF termination at the applied RF frequency and the exact position of the termination are chose to optimize transfer of RF power from the RF source 38 to the dishcarge 12 and to minimize reflection of RF power from the discharge region 12 back to the RF source. The RF termination 34 has also been placed at a point where a high voltage pulse may be applied from a high voltage pulse source 36. In order to prevent damage to the RF source 38, the dielectric material 32 is placed in the stripline wave guide electrode to prevent passage of a high voltage preionization pulse to the RF source. Similarly, the high voltage preionization pulse source 36 is also protected from RF damage by an RF choke 40 which is placed between the stripline wave guide 30 and the high voltage pulse source 36.

The gas discharge tube 42 is constructed of a dielectric material and the gases within the tube may be either stationary or flowing.

In accordance with well known laser construction techniques, mirrors 44 and 46 provide for reflection of light back into the tube. Either mirror 44 or 46 may also be partially transmissive and provide for transmission of laser generated light through the mirror and out of the laser system.

A ground plane 48 is placed beneath the stripline conductor 30 and beneath the discharge tube 42. In this construction, the microwave energy lies within the region between the stripline conductor 30 and the ground plane 48 and is guided through the discharge tube 42.

Above the ground plane and surrounding the stripline wave guide is placed a further dielectric material indicated generally as 50. This dielectric material may be a liquid such as a fluorocarbon or mineral oil. In certain applications it may also be desirable to use a solid dielectric material in the region 50. Dielectric material 50 provides for electrical insulation between the stripline conductor 30 and the ground plane 48 and prevents spurious electrical breakdown.

It is also important that the discharge tube 42 be constructed of a dielectric material so that capacitive ballasting of the discharge is achieved. The use of a dielectric discharge tube also allows for the selection of tube materials which are non-metallic. Non-metallic tubes which are resistant to corrosive gases may be used. Similarly, selection of the dielectric material 50 should provide for a inert material which will retard or eliminate parasitic breakdown in the dielectric 50.

The preionization is provided by a high voltage pulse from source 36. The high voltage pulse current flow is limited by the presence of the dielectric walls of the tube 42 so that the resulting excitation level of the gas is low. However, sufficient ionization of the gas is produced, to bring the plasma to a state in which maintenance of the discharge can be accomplished with the RF field level from source 38 and across the tube 42. Preionization also helps assure that the RF excitation of the gas plasma will be spatially uniform even during application of the initial part of the RF pulse to tube 42.

The gases used within the discharge tube 42 may include carbon dioxide lasing gases, rare gas halide laser gases (XeF, XeCl, KrF, and ArF) and neutral xenon or xenon dimer laser gases. In this invention, it has been found that the use of high pressure carbon dioxide laser gas mixtures (in the order of 10 atmospheres) produces a broadening of the spectral lines to the point that they are merged and are indistinguishable.

In FIG. 3 the tube 50 is in a rectilinear cross section form which is compatible with the stripline wave guide electrode. This permits the use of transmission line techniques and a stripline geometry to achieve efficient delivery of excitation power at high RF frequencies. However, other tube geometries, including cylindrical tubes, which are compatible with the stripline geometry may be used.

The present invention has been shown and described with reference to a particular embodiment. It should however, be understood that various changes and modifications which are obvious to a person skilled in the art to which this invention pertains are deemed to lie within the spirit, the scope, and contemplation of the invention.

I claim:

1. A high frequency high power stabilized RF discharge laser comprising in combination;

a ground plane;

a stripline waveguide electrode having first and second ends located in a plane substantially parallel to said ground plane;

an RF souce connected to said first end of said stripline waveguide electrode by a means for preventing a high voltage pulse from damaging said RF source;

a discharge tube located between said ground plane and said stripline waveguide electrode;

preionization pulse means including a high voltage source applying a high voltage pulse to said second end of said stripline waveguide electrode and a means placed between said high voltage pulse source and said stripline waveguide electrode for preventing said RF from damaging said high voltage source; and a waveguide region formed by said ground plane and said stripline waveguide electrode wherein said discharge tube lies within said waveguide region.

2. The apparatus of claim 1 wherein said preionization pulse means preionizes said gas.

3. The apparatus in accordance with claim 2 further including a dielectric section of material located in said stripline waveguide for preventing said preionization pulse from damaging the source of high power RF.

4. The apparatus in accordance with claim 1, further including dielectric insulation material located in said waveguide region.

5. The apparatus in accordance with claim 4, wherein said dielectric insulation material withstands high RF intensities without parasitic breakdown.

6. The apparatus in accordance with claim 5, wherein said dielectric insulation material is an inert material.

7. The apparatus in accordance with claim 1, wherein said discharge tube is constructed of a dielectric material.

8. The apparatus in accordance with claim 7, wherein said dielectric material is a ceramic material which resists corrosion by lasing gases.

9. The apparatus in accordance with claim 1, wherein a dielectric material covers the entire region defined by said ground plane, and extends under and beyond said stripline waveguide conductor.

10. The apparatus in accordance with claim 1, wherein the gas located in said discharge tube is under pressure in excess of one atmosphere.

11. The apparatus in accordance with claim 1, wherein the gas pressure in said discharge tube is greater than one atmosphere and as high as 10 atmospheres.

12. The apparatus in accordance wtih claim 1, wherein said RF frequency is greater than 900 MHz.

13. The apparatus in accordance with claim 1, wherein said discharge tube has a power level on the order of or greater than 10 kilowatts per centimeter cubed.

14. The apparatus in accordance with claim 1, wherein said gas is a carbon dioxide lasing gas.

15. The apparatus in accordance with claim 1, wherein said dielectric material provides a capacitive ballasting of the discharge which results in improved stability and homogeneity.

16. The apparatus in accordance with claim 1, wherein said gas is a high pressure gas selected from the group of carbon dioxide, rare gas halide XeF, XeCl, KrF, and ArF, neutral xenon and xenon dimer.

17. The apparatus of claim 1, wherein said gas is contained within a metal-free environment.

18. The apparatus of claim 1, further including a transmission line termination for said waveguide which provides for power transfer to the gas and reflection of RF power back into the RF source.

19. A high frequency high power stabilized discharge laser comprising an RF discharge laser having:
 a stripline waveguide inducing a free ionization discharge into a discharge region by a means for applying a high voltage pulse to one end of said stripline electrode and a means for applying RF excitation to a second end of said stripline electrode; and
 said discharge region having layers comprising in order: conductor, dielectric, plasma, dielectric, and ground plane.

20. The apparatus in accordance with claim 19, wherein the stripline waveguide and ground plane are immersed in a dielectric which inhibits spurious discharges external to said discharge region.

21. The apparatus in accordance with claim 19, wherein said plasma lies in a region defined by two planar dielectric sheets which lie between said conductor and said ground plane.

22. Teh apparatus of claim 21, wherein said dielectric material is a fluid.

23. The apparatus of claims 21, wherein said dielectric material is a solid.

24. The apparatus in accordance with claim 19, wherein there is transverse flow of a lasing gas through the discharge region.

25. The apparatus of claim 19, wherein said discharge region includes a tube having a rectilinear cross section and is constructed with a dielectric material.

26. The apparatus of claim 24, wherein said gas is carbondioxide.

* * * * *